United States Patent [19]

Lagneau

[11] 4,084,651
[45] Apr. 18, 1978

[54] LIQUID-ACTUATED WEIGHING APPARATUS

[76] Inventor: Jean Henri Lagneau, 30, route du Vallon Sainte-Gemme-Moronval, 28105 Vernouillet, France

[21] Appl. No.: 727,219

[22] Filed: Sep. 27, 1976

[30] Foreign Application Priority Data

Oct. 3, 1975   France .................................. 75 30305

[51] Int. Cl.² .......................... G01G 1/30; G01G 1/26; G01G 5/04
[52] U.S. Cl. .................................. 177/192; 177/248; 177/254
[58] Field of Search ............... 177/208, 209, 192, 246, 177/248, 250, 256, 254

[56] References Cited

U.S. PATENT DOCUMENTS

| 1,524,928 | 2/1925 | Hardel et al. | 177/208 X |
| 1,613,192 | 1/1927 | Pulz | 177/248 |
| 1,798,076 | 3/1931 | Frisch | 177/208 |
| 2,023,164 | 12/1935 | Cady | 177/192 X |
| 2,052,116 | 8/1936 | Strauss | 177/209 |

FOREIGN PATENT DOCUMENTS 345,696   1/1937   Italy ....................... 177/208

Primary Examiner—George H. Miller, Jr.
Attorney, Agent, or Firm—Michael J. Striker

[57] ABSTRACT

A weighing apparatus has a closed chamber of variable volume adapted to receive a load. An upright tube has an upper end open to the atmosphere and a lower end connected via a conduit to the chamber for fluid communication therebetween. This conduit has a first section of relatively small diameter connected between the upper end of a large-diameter reservoir and a second narrow-diameter section connecting the lower end of the reservoir with the lower end of the tube. A first liquid of relatively light density completely fills the chamber, the first section of the tube, and the upper portion of the reservoir. A second liquid of relatively heavy density completely fills the second section of the conduit, the rest of the reservoir, and a portion of the tube. Thus compression of the closed chamber will move the surface level of the second relatively heavy liquid upwardly in the tube. The increase in the weight of the mass of the heavy liquid in the tube can be weighed or measured to determine the weight of the object.

10 Claims, 3 Drawing Figures

LIQUID-ACTUATED WEIGHING APPARATUS

BACKGROUND OF THE INVENTION

The present invention relates to a weighing apparatus. More particularly, this invention concerns a springless scale capable of very accurately measuring weight.

A scale is known wherein a chamber of variable volume defined by a cylinder and piston displaceable therein is connected via a conduit to a further smaller-diameter chamber also having a piston. The two chambers and the conduit between them are completely filled with an incompressible fluid. Both of the pistons are turned upwardly and are downwardly displaceable into the respective chambers to reduce the volumes thereof. Thus, when a weight is rested on the large-diameter piston, the small-diameter piston will be displaced upwardly. It is possible in such an arrangement to provide a plurality of such large-diameter piston arrangements connected via respective conduits to a plurality of such smaller-diameter piston arrangements all of whose piston rods are interconnected so that their positions can be determined.

Such an arrangement has shown that even when the pistons and their cylinders are machined with utmost care, the considerable friction between the pistons and the cylinders falsifies the readings to such an extent that the scale cannot be used for accurate scientific measurement. Furthermore, this friction, which is a function of temperature, wear, and other factors that are impossible to compensate out.

SUMMARY OF THE INVENTION

These objects are attained according to the present invention in a weighing apparatus comprising the closed chamber of variable volume adapted to receive a load, an upright tube having an upper end open to the atmosphere and a lower end, a conduit connecting this lower end to the chamber for fluid communication between the chamber and the tube, and first and second liquids of relatively light and relatively heavy density completely filling the conduit and having an upper surface in the tube. The first liquid of relatively light density completely fills the chamber and partially fills the conduit between the chamber and the tube. The second liquid of relatively heavy density completely fills the rest of the conduit and forms therein an interface with the first liquid. This second liquid also partially fills the tube and has its upper surface in this tube. The mass of the second liquid above a minimum level is measured in order to determine the weight of the load that is compressing the closed chamber. Thus when the chamber is loaded its volume will decrease and the upper surface of the second liquid in the tube will similarly be displaced upwardly to an extent directly proportional to the weight of the load.

With such a system the only friction involved is the virtually negligible friction necessary to compress the chamber and the friction of the liquid inside the conduit, the chamber and the tube. Such friction is so extremely small as to have virtually no effect on the measurements taken so that extremely accurate and reliable results can be obtained.

In accordance with another feature of this invention the conduit has a large-diameter portion which forms a reservoir in which the liquid interface lies. The conduit comprises a first tube section extending from the upper end of this reservoir to the chamber and completely filled with the first liquid and a flexible second tube section extending from the lower end of the reservoir to the lower end of the tube.

According to another feature of this invention the first liquid is a light-weight oil so that it offers a minimal resistance to compression of the measuring chamber and flows very readily through the first tube section. The second liquid is, however, mercury which has such considerable density and weight per unit volume that only a small volume of this mercury need be displaced by the load for measuring.

According to yet another feature of this invention the tube is carried on one arm of the beam of a justice scale. It is therefore possible to move a counterpoise along the other arm of this justice scale in order accurately to measure the increased mass of mercury in the tube after a load has been placed on the chamber and the mercury has been moved upwardly in the tube.

According to yet another feature of this invention a plurality of such chambers support a load table and are compressible by this table. Each of these chambers is connected to a respective tube as described above and all of the tubes are carried on the arm of the justice scale as described above. Thus it is possible with this device to make extremely accurate weighings of relatively heavy objects.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

SPECIFIC DESCRIPTION OF PREFERRED EMBODIMENTS

Figure 1:
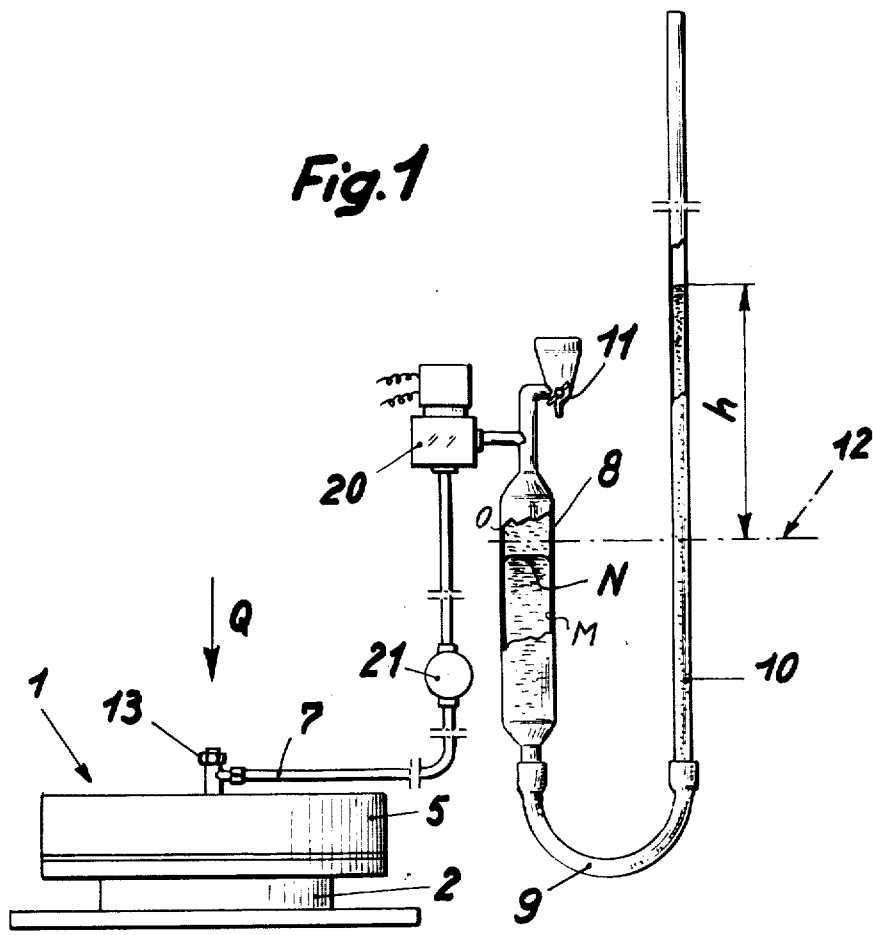
FIG. 1 is a side partly broken away view of the apparatus according to this invention.
Figure 2:
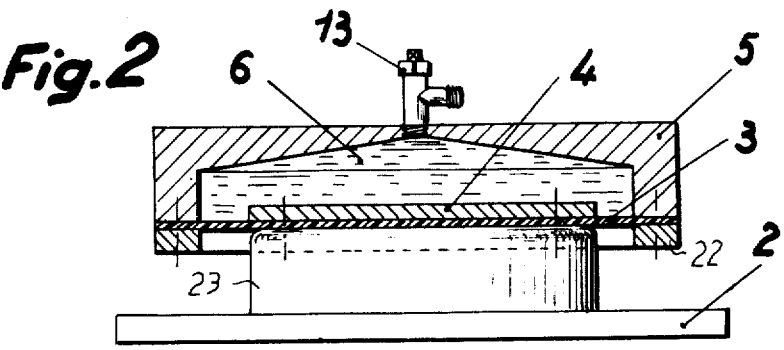
FIG. 2 is a partly sectional view of a detail of the apparatus of FIG. 1.

As shown in FIGS. 1 and 2, the scale according to this invention has a compressible chamber 1 provided with a base 2 upwardly from which extends a large-diameter piston 23. A downwardly open cup 5 has its lower end closed by an elastically deformable membrane 3 held in place on its periphery by a ring 22. A disc 4 is clamped through the membrane 3 to the piston 23. Thus the member 5 defines a chamber 6 whose volume can be decreased by pushing the member 5 downwardly on the piston 23 so as to deflect the elastic wall 3 inwardly.

A conduit 7 extends from a bleeder valve 13 on top of the member 5 to the top of an upright large-diameter reservoir 8. Another conduit 9, this one necessarily of flexible material, connects the lower end of this reservoir 8 with the lower end of an upright tube 10 of uniform flow cross-section and having an open upper end.

The lower portion of the reservoir 8 is filled up to a level N from a source 11 with mercury M. The bleeder valve is opened and relatively light oil O is poured into the top of the reservoir 8 so as to fill up this reservoir 8 above the mercury M, completely fill the conduit 7, and also completely fill the chamber 6. When all air has been driven out of the conduit 7 and chamber 6 the bleeder valve 13 is closed.

Once filled in this manner, the mercury will rise in the tube 10 normally to a level indicated at 12 which is slightly above the interface N between the mercury M and the oil O. Downward depression of the member 5 in the direction indicated by arrow Q will, however, lessen the volume of the chamber 6 and correspondingly force the interface N between the nonmiscible liquids O and M downwardly so that the liquid level in the tube 10 will rise through a distance $h$. With the tube 10 whose inside measurement is uniformly calibrated the distance $h$ will be directly proportional to the force in the direction of arrow Q.

It is noted in this context that a manometer or pressure sensor 21 is provided in the tube section 7 and is connected to an electromagnetic valve 20 downstream of the manometer 21 yet upstream of the reservoir 8. The valve 20 is only opened when a measurement is to be made in order to eliminate variances which might be caused as the load is set on the element 1. In addition, this valve 20 is automatically closed by the manometer 21 whenever the pressure in the conduit 7 exceeds a predetermined limit which is so set as to correspond to the point when the mercury M might issue from the top of the tube 10.

The pressure P which is proportional to the weight is thus balanced out by that of the column of mercury having height $h$. If $s$ is taken to be the cross-sectional area of the tube 10 and $d$ the density of the mercury M, the following formula pertains:

$$P\left(\frac{kg}{m^2}\right) = \frac{s(m^2) \times h(m) \times d\left(\frac{kg}{m^3}\right)}{s(m^2)}$$
$$= h(m) \times d\left(\frac{kg}{m^3}\right).$$

If S is the surface area of the piston disc 4 then:

$$\frac{Q(kg)}{S(m^2)} = h(m) \times d\left(\frac{kg}{m^3}\right)$$

or $$Q = h \times S \times d$$

Thus if S and $d$ are constant as they are in this system, the weight Q is directly proportional to the height $h$.

Nonetheless, for reasons given below it has been found preferable to weigh the height of the column of mercury which is equal, when multiplied by a proportionality factor, to the weight Q of the load being measured. This proportionality factor can be determined experimentally and depends mainly on the diameter of the tube 10.

Thus if H is the maximum height to which the column of mercury can raise, the maximum pressure employable will be equal to H × $d$. With this pressure value it is therefore relatively simple to determine the diameter which should be given to the plate 4 in order to prevent exceeding the maximum pressure when the maximum weight is placed on the member 5.

If this maximum charge $Q_m$ is in the order of a ton of force, for example, it would be reasonable to displace a mass of mercury weighing a hectogram and therefore forming a ratio with the maximum force of 1/10000.

In order to contain a mass of mercury of 100 grams of force in the tube 10 it is therefore necessary to give to this tube a cross-sectional area equal to $$s(m^2) = \frac{Q_m(kg)}{n \times H(m) \times d\left(\frac{kg}{m^3}\right)}$$

Thus it can be seen that $s$ only depends on the value of the ratio $n$ which is chosen.

Figure 3:
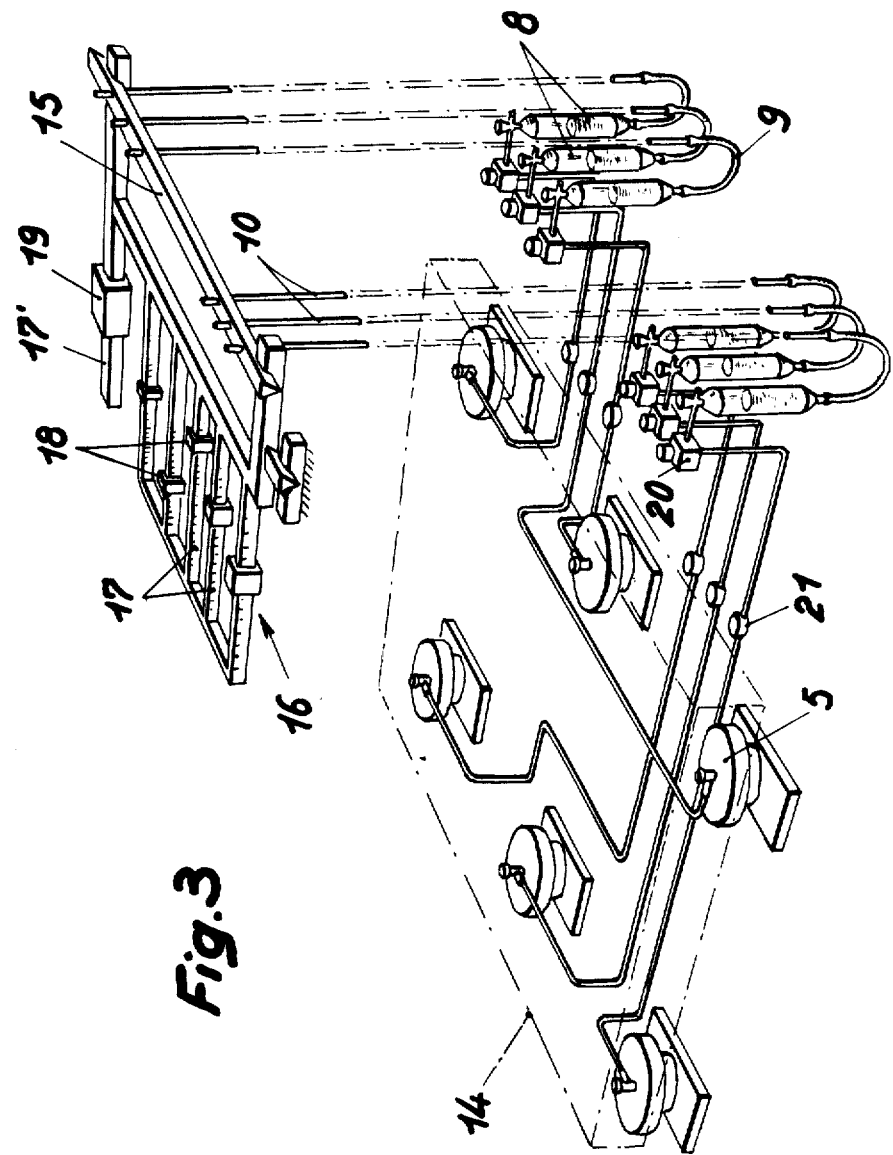
FIG. 3 is a perspective and partly diagrammatic view of another apparatus employing the scale of FIG. 1.

In order to weigh relatively great masses without using extremely long tubes 10, it is possible to employ the arrangement of FIG. 3 wherein reference numerals for structure identical to that of FIGS. 1 and 2 are used throughout.

In FIG. 3 a plate or table 14 is supported on six of the members 5 connected via respective conduits to respective tubes 10. These tubes 10 are all carried on one arm 15 of a balance 16 having other arms 17 and 17'. The arm 17' is provided with an adjustment weight 19 that is employed before the start of measuring to cancel out the weight of the table 14 and other extraneous factors. The arms 17, five of which are provided, each carry a respective counterpoise 18. These counterpoises 18 are of decimally graduated sizes so that it is possible with this system very accurately to determine the weight of the mercury in the tubes 10.

the advantage of a system wherein the weight of the column of mercury in the tube 10 or in a plurality of such tubes 10 is measured is that any changes in the system due to wear, age or the like, will have no effect on the measurement. Thus, for instance, if the level drops substantially below the level 12, but nonetheless remains in the tube 10 the measurement will be perfectly accurate. It is merely necessary at the start of each weighing operation to move the adjustment counterpoise 19 into a position for perfect balancing of the beam scale 16.

It will be understood that each of the elements described above, or two or more together, may also find a useful application in other types of structure differing from the types described above.

While the invention has been illustrated as described as embodied in a weighing apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A weighing apparatus comprising:
   a closed compressible chamber of variable volume;
   a reservoir having a lower end;
   a conduit interconnecting said chamber and said reservoir;
   a first liquid filling said conduit and said chamber.
   an upright tube having an upper end open to the atmosphere and a lower end;

a flexible conduit connecting said lower ends together;

a second liquid filling said flexible conduit, at least part of said reservoir, and at least part of said upright tube; and means for weighing the mass of said second liquid displaced in said tube on compression of said closed chamber.

2. The apparatus defined in claim 1 wherein said means comprises a justice scale having a beam with an arm carrying said tube.

3. The apparatus defined in claim 1 wherein a plurality of such conduits, chambers, reservoirs, and tubes are provided, said means comprising a justice scale having a beam with an arm carrying all of said tubes.

4. A weighing apparatus comprising:

a closed chamber of variable volume adapted to receive a load;

an upright tube having an upper end open to the atmosphere and a lower end;

a conduit connecting said lower end to said chamber for fluid communication therebetween;

a first liquid or relatively light density completely filling said chamber and partially filling said conduit;

a second liquid of relatively heavy density completely filling the rest of said conduit and forming therein an interface with said first liquid, said second liquid partially filling said tube and having in said tube an upper surface displaceable upwardly on compression of said closed chamber from a minimum level; and means for weighing the mass of said second liquid above said minimum level.

5. The apparatus defined in claim 4 wherein said first liquid is oil and said second liquid is mercury.

6. The apparatus defined in claim 4 wherein said conduit is of relatively small diameter and includes a reservoir portion of relatively large diameter and having an upper end and a lower end, said interface lying in said reservoir portion and said conduit having a first section completely filled with said first liquid and extending between the upper end of said reservoir portion and said chamber and a second section completely filled with said second liquid and extending between said lower ends.

7. The apparatus defined in claim 6 further comprising a vlave in said conduit and means for closing said valve when said pressure in said chamber exceeds a predetermined maximum.

8. The apparatus defined in claim 6 wherein said chamber has an elastically deformable diaphragm forming one of its walls, whereby inward deflection of said diaphragm by a load decreases the volume of said chamber.

9. The apparatus defined in claim 6 wherein said second tube section is flexible, said means including a justice scale having a beam with one arm carrying said tube.

10. The apparatus defined in claim 9, further comprising a load-supporting table, a plurality of such chambers supporting said table and compressible thereby, a plurality of such conduits having first sections connected to the respective chambers and second sections extending from the respective reservoir portions, and a plurality of such tubes all carried on said arm and each connected to a respective second tube section.

* * * * *